July 26, 1927.

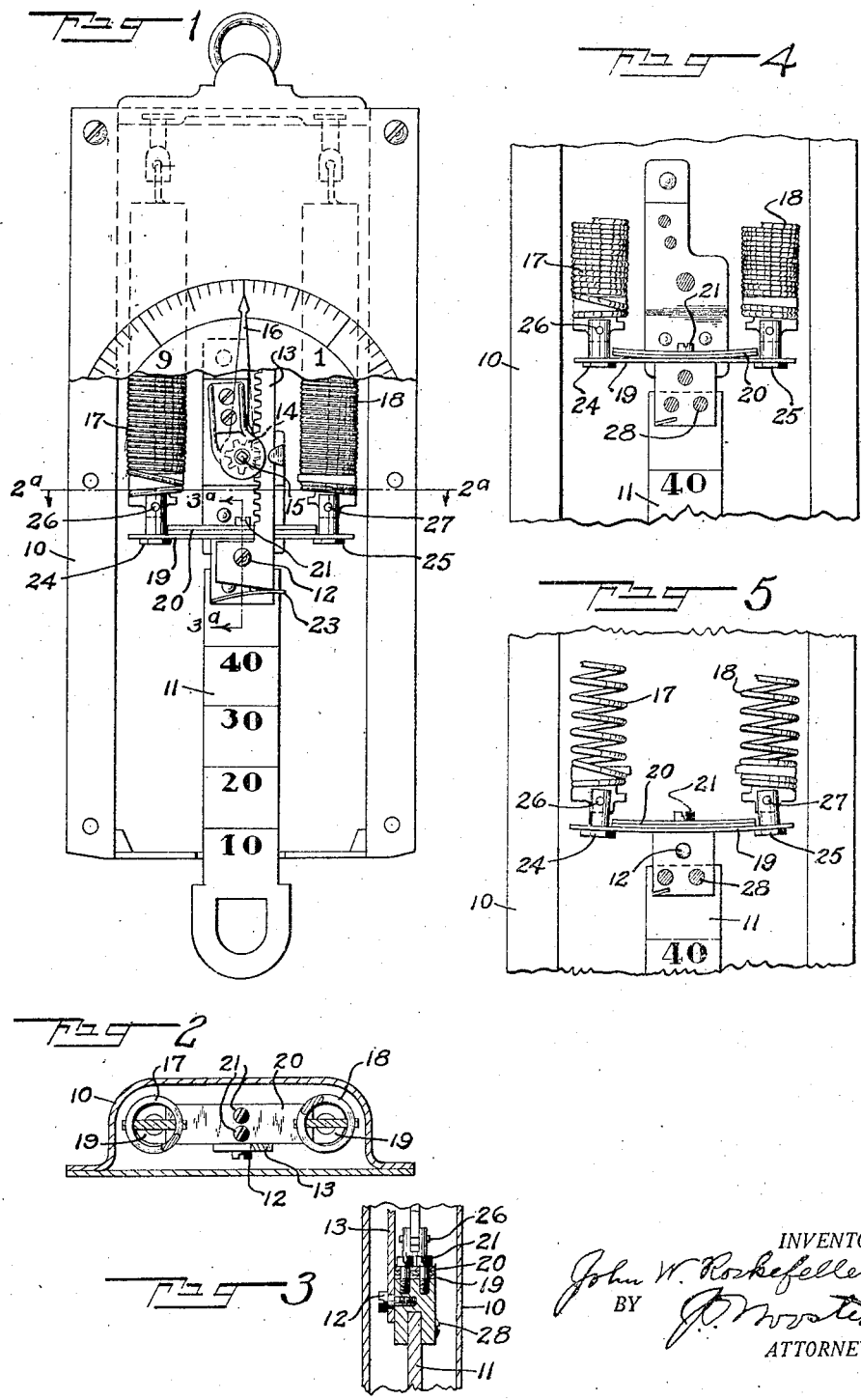

J. W. ROCKEFELLER, JR 1,636,708

SPRING SCALE

Filed April 29. 1926

INVENTOR
John W. Rockefeller Jr.
BY
ATTORNEY

Patented July 26, 1927.

1,636,708

UNITED STATES PATENT OFFICE.

JOHN W. ROCKEFELLER, JR., OF NEW YORK, N. Y., ASSIGNOR TO JOHN CHATILLON & SONS, OF NEW YORK, N. Y., A CORPORATION OF NEW YORK.

SPRING SCALE.

Application filed April 29, 1926. Serial No. 105,384.

This invention relates to scales, particularly those provided with automatic means to compensate for changes in the resiliency of the spring with temperature variation, and has for its object to provide a simple and inexpensive means for automatically increasing the accuracy of spring scales under changes in temperature.

According to this invention, a scale is provided comprising a compound spring system having a coil spring and two leaf springs which together are in series with the coil spring, one of the leaf springs being substantially unaffected by temperature, and the other a bi-metallic leaf spring to contact with more of the length of the other leaf spring upon increase in temperature and to contact less with said other leaf spring upon decrease in temperature, to neutralize temperature variations in resiliency in the coil springs.

Referring to the drawings:

Fig. 1 illustrates one embodiment of this invention.

Fig. 2 is a section on the line 2ª—2ª of Fig. 1.

Fig. 3 is a section on the line 3ª—3ª of Fig. 1.

Fig. 4 is a detail corresponding to Fig. 1 in colder weather.

Fig. 5 is a detail corresponding to Fig. 4 under load.

Figure 6:
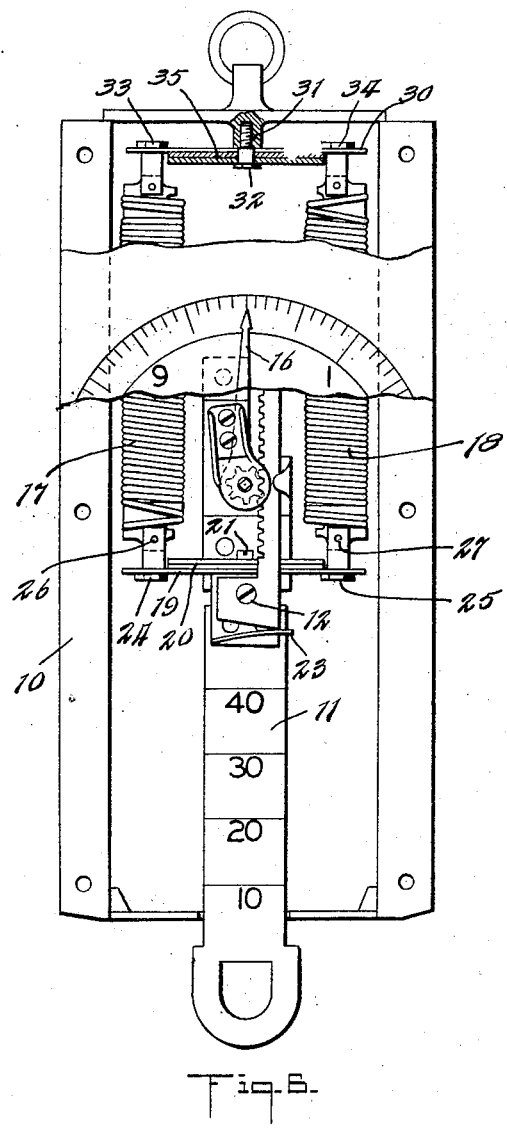
Fig. 6 shows another embodiment of this invention employing two thermal elements, one at the top and one at the bottom of the springs.

Through the usual casing 10 extends a runner or load support 11 which actuates the rack 13 pivoted at 12 to the load support or runner 11. Engaging rack 13 is the pinion 14 on the shaft 15 of the indicator 16. Coil springs 17 and 18 are secured at their upper ends to the casing and at their lower ends to the flat spring beam 19. Secured by clamp screws 21 to the flat spring beam 19 is the bi-metallic thermostatic element 20, preferably composed of zinc and invar or of brass and invar, with the brass or zinc arranged on top. Spring 23 engages the lower end of the rack 13 and keeps the same in engagement with the pinion 14. Nuts 24 and 25 adjustably control the attachment of the beam 19 to the lower ends of the coil springs 17 and 18. This attachment being provided with the pivots 26 and 27 to lessen transverse movement of the springs with elongation, as shown in Figs. 4 and 5, the rivets 28 connect the load support 11 with the rack and its pivot 12. Fig. 6 shows a scale similar to that in Fig. 1 except that an additional thermally controlled beam 30 is employed at the top of the springs instead of having the springs attached directly to the casing. The spring beam 30 corresponds to the beam 19 of Fig. 1 and is attached to the frame or casing at 31 by means of the bolt 32. Securing means 33 and 34 are used for the springs the same as the securing means 24 and 25 at their lower ends. The bi-metallic thermal element 35 is like the element 20 except that the element 35 is reversed, i. e. the invar is arranged on the top. Such a construction gives increased compensation and is of use where long springs are employed.

Among the advantages of this invention may be mentioned its simplicity and cheapness, also its freedom from any complicated system of levers and the like. In practice, the thermostatic element 20 is in contact with varying lengths of the beam 19 under changes in temperature. The element 20, being slightly resilient, has the effect of varying the resiliency of the spring beam 19 by changing its effective length, or considering spring beam 19 and thermostatic element together as a compound spring, its effective thickness is changed, and it therefore varies its resiliency with temperature. Under no-load conditions with low temperatures the element 20 contacts with only a relatively short length of the spring beam 19, while with higher temperatures the thermostatic element contacts throughout a greater length of said spring beam. While the coil spring has been illustrated as attached directly to the casing, it will be understood that the coil spring might be attached to the casing through the two leaf springs illustrated or in scales having very long coil springs these two leaf springs may be used at each end of the coil spring as in Fig. 6. With thermal compensation at the top and bottom of the springs, a greater degree of compensation for resiliency is present and the construction illustrated possesses the added advantage of enabling the springs to be substantially parallel at all times and obviates any error due to change in the moment arm. The beams 19 and 30 are more resilient than their respective thermal elements.

I claim:

1. A scale comprising a coil spring, a casing to which said spring is attached, a runner to which said spring is attached at the opposite end, an indicator responsive to the elongation of the spring under load, a flat spring connected at a free end to said coil spring, temperature responsive means for automatically varying the resiliency of said flat spring by varying its effective thickness.

2. A scale comprising a compound spring system having a coil spring and two leaf springs which together are in series with the coil spring, one of the leaf springs being substantially unaffected by temperature, and the other a bi-metallic leaf spring arranged to contact with more of the length of said first leaf spring upon increase in temperature and less upon decrease in temperature to neutralize temperature variations in resiliency in said coil spring.

3. A scale comprising a coil spring, a casing to which said coil spring is attached, a runner to which said spring is attached at the opposite end, an indicator responsive to elongation of said spring under load, a compound flat spring connected at a free end of said coil spring and including a temperature responsive means for automatically varying the resiliency of said compound spring by varying its effective thickness.

4. A scale comprising a coil spring, a casing to which said spring is attached, a runner to which said spring is attached at its opposite end, an indicator responsive to elongation of the spring under load, a flat spring connected at a free end to said coil spring, a yieldable fulcrum for said flat spring, and temperature responsive means for automatically varying the position of said fulcrum and varying the resiliency of said flat spring inversely to change in resiliency of said coil spring.

5. A scale comprising a coil spring, a casing to which the spring is attached, a runner to which the spring is attached at the opposite end, an indicator responsive to elongation of said spring under load, a flat spring connected at a free end to said coil spring, a rolling fulcrum for said flat spring, and means for rolling said fulcrum along said flat spring to have greater or less longitudinal contact with said flat spring in response to variations in temperature.

6. A scale comprising a coil spring, a casing to which said spring is attached, a runner to which the spring is attached at the opposite end, an indicator responsive to elongation of said spring under load, a flat spring connected at a free end to said coil spring, and a thermostatic element secured longitudinally of said flat spring for engagement with varying lengths of said flat spring.

7. A scale comprising a pair of coil springs, a casing to which said springs are attached, a flat spring beam to which said springs are attached at their opposite ends, an indicator actuated by said beam, and temperature responsive means for automatically varying the resiliency of said beam.

8. A scale comprising a pair of coil springs, a casing to which said springs are attached, a flat spring beam to which said springs are attached at their opposite ends, an indicator actuated by said beam, and a bi-metallic thermostatic element clamped adjacent the central portion of said beam to automatically vary the resiliency of said beam in response to temperature.

9. A scale comprising a pair of coil springs, a casing to which said springs are attached, a flat spring beam to which said springs are attached at their opposite ends, an indicator actuated by said beam, and a be-metallic thermostatic element of less resiliency than said beam clamped thereto adjacent the central portion and arranged to vary the resiliency of said beam in response to temperature inversely as the resiliency of said coil springs is changed.

10. The combination with a support, of a compound flat spring secured to said support and comprising a bi-metallic thermal element secured longitudinally to and forming a part of said spring adjacent said support and arranged to correct for changes in resiliency of said spring with temperature.

11. A scale comprising a coil spring, a casing to which said spring is attached, a runner to which said spring is attached at the opposite end, an indicator responsive to elongation of the spring under load, a flat spring connected at a free end to each end of said coil spring, and temperature responsive means for automatically varying the resiliency of said flat spring.

12. A scale comprising a coil spring, a casing to which said coil spring is attached, a runner to which the spring is attached at the opposite end, an indicator responsive to elongation of the spring under load, a flat spring connected at a free end to each end of said coil spring, and a thermostatic element secured longitudinally of each flat spring for engagement with varying lengths of each flat spring.

13. A laminated flat spring comprising a bi-metallic thermostatic spring element and a longer and more resilient flat spring secured longitudinally to said element and projecting beyond an end thereof.

Signed at New York city, in the county of New York and State of New York, this 20th day of April, A. D. 1926.

JOHN W. ROCKEFELLER, Jr.